US007799477B2

(12) United States Patent
Metzler et al.

(10) Patent No.: US 7,799,477 B2
(45) Date of Patent: Sep. 21, 2010

(54) AIRCRAFT HAVING A FUEL CELL

(75) Inventors: Dirk Metzler, Hoerbranz (AT); Ralf Brugger, Wangen (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 92 days.

(21) Appl. No.: 11/376,823

(22) Filed: Mar. 16, 2006

(65) Prior Publication Data
US 2007/0026268 A1 Feb. 1, 2007

(30) Foreign Application Priority Data
Mar. 16, 2005 (DE) ........................ 10 2005 012 120

(51) Int. Cl.
*H01M 8/06* (2006.01)
*H01M 8/04* (2006.01)
(52) U.S. Cl. .................. 429/443; 429/400; 429/408; 429/428
(58) Field of Classification Search .................. 429/34
See application file for complete search history.

(56) References Cited
U.S. PATENT DOCUMENTS

| 3,704,172 | A | | 11/1972 | Stedman et al. | |
|---|---|---|---|---|---|
| 4,202,933 | A | * | 5/1980 | Reiser et al. | 429/13 |
| 4,686,157 | A | * | 8/1987 | Miyake et al. | 429/19 |
| 5,346,778 | A | * | 9/1994 | Ewan et al. | 429/19 |
| 5,486,428 | A | * | 1/1996 | Gardner et al. | 429/19 |
| 5,976,725 | A | * | 11/1999 | Gamo et al. | 429/25 |
| 6,268,077 | B1 | * | 7/2001 | Kelley et al. | 429/33 |
| 6,296,957 | B1 | * | 10/2001 | Graage | 429/12 |
| 6,558,827 | B1 | | 5/2003 | Reiser | |
| 6,610,433 | B1 | * | 8/2003 | Herdeg et al. | 429/17 |
| 2003/0072980 | A1 | * | 4/2003 | Formanski et al. | 429/13 |
| 2004/0121218 | A1 | | 6/2004 | Andrews | |

FOREIGN PATENT DOCUMENTS

| EP | 1099630 | 5/2001 |
|---|---|---|
| WO | 2004/051780 | 6/2004 |
| WO | 2005/004269 | 1/2005 |

* cited by examiner

*Primary Examiner*—Dah-Wei D Yuan
*Assistant Examiner*—Adam A Arciero
(74) *Attorney, Agent, or Firm*—Dilworth & Barrese LLP

(57) ABSTRACT

The invention relates to an aircraft, in particular to an airplane, having at least one fuel cell, having at least one supply line which connects the fuel cell to a fuel supply, having at least one outlet line by means of which fuel supplied by the supply line and not consumed in the fuel cell is drained off and having means for the influencing of the fuel flow through the fuel cell as well as having means for the influencing of the fuel flow through the fuel cell, with the means for the influencing of the fuel flow having a pressure regulator located in the at least one supply line and a restrictor member located in the at least one outlet line, with the pressure regulator regulating the pressure of the fuel supply to the operating pressure of the fuel cell and with the restrictor member reducing the flow of the fuel flowing through the outlet line.

16 Claims, 1 Drawing Sheet

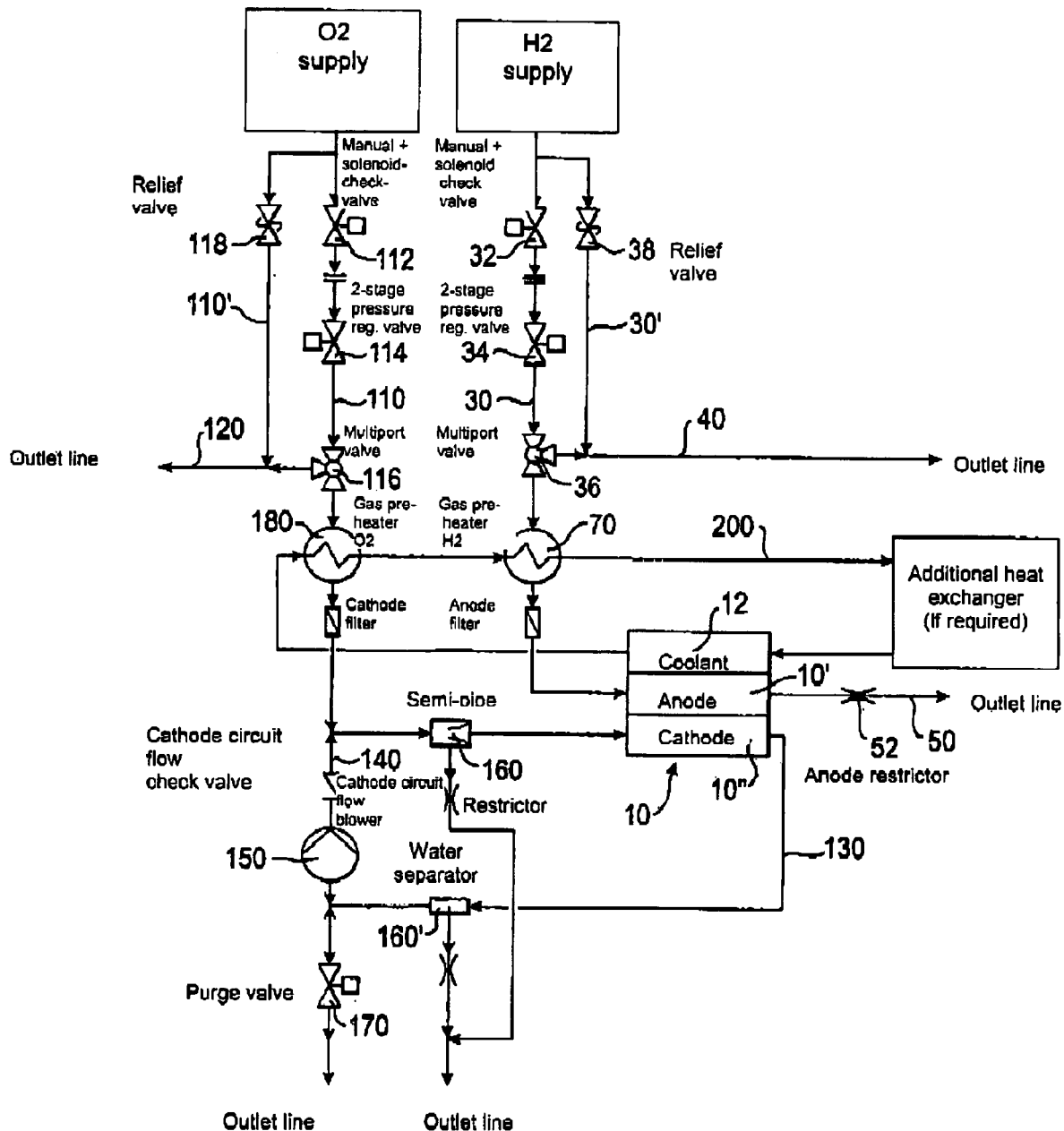

AIRCRAFT HAVING A FUEL CELL

BACKGROUND OF THE INVENTION

The invention relates to an aircraft, in particular to an airplane, having at least one fuel cell, having at least one supply line which connects the fuel cell to a fuel supply, having at least one outlet line by means of which fuel supplied by the supply line and not consumed in the fuel cell is drained off and having means for the influencing of the fuel flow through the fuel cell.

The use of fuel cells in aeronautics is known. The fuel cells deliver electrical energy which can be utilized to drive different components of an aircraft. The advantage of the use of fuel cells is an efficiency which is improved with respect to conventional systems with reduced pollution and noise emissions. In fuel cells known from the art, the supply of the fuels to the fuel cell takes place by means of supply lines which are in connection with a corresponding fuel supply. In this process, flow regulators, generally so-called mass flow controllers, are located in the supply lines and ensure the desired fuel flow through the anode side and the cathode side of the fuel cell. The disadvantage of such flow regulators is a comparatively high proneness to defects and the technical regulation effort associated with their use.

SUMMARY OF THE INVENTION

It is therefore the object of the invention to further develop an aircraft, in particular an airplane, of the initially named kind such that the means of influencing the fuel flow have a simple structure and a low proneness to defects.

This object is solved in that the means of influencing or adjusting the fuel flow have a pressure controller located in the at least one supply line and a restrictor member located in the at least one outlet line, with the pressure controller reducing or regulating the pressure of the fuel supply to the operating pressure of the fuel cell and with the restrictor member restricting the flow of the non-consumed fuel flowing through the outlet line. A flow regulator is not provided.

The fuel cell is operated at a "fuel overflow", i.e. more fuel is supplied than is converted in the fuel cell.

Deviating from previously known systems, the fuel cell in accordance with the invention is thus not operated at a constant mass flow or volume flow which is adjusted via a controller comparatively prone to defects, but the fuel cell is operated at a constant pressure for whose setting a pressure regulator or pressure reducer arranged upstream of the fuel cell serves which reduces the supply pressure to the operating pressure of the fuel cell. A restrictor is located downstream of the fuel cell in the associated draining line and reduces the flow of the fuel flowing through the exhaust line and ensures that too large a flow through the fuel cell is not present downstream of the restrictor even at a low pressure.

An arrangement of this type is preferably used on the anode side of the fuel cell.

In a preferred aspect, the fuel supply is a hydrogen tank or a lead supplying hydrogen. The named supply line leads from the hydrogen tank or from the line to the anode of the fuel cell whose pressure is set to the desired value by means of the pressure regulator located in this supply line. The hydrogen supplied in this manner and not consumed is drained off by means of the outlet line in which the restrictor is located. The outlet line can open in a ram air duct of the aircraft, i.e. the overflow fuel or hydrogen is mixed with the very much larger ram air flow.

In a further aspect of the invention, a further supply line is provided which connects a further fuel source to the fuel cell. A further outlet line is furthermore provided by means of which fuel supplied through the further supply line and not consumed in the fuel cell is drained off. An "overflow is preferably also present for the fuel taken from the further fuel supply, i.e. the volume of the fuel supplied to the fuel cell is larger than the volume of the fuel consumed.

In a further aspect of the invention, a compressor is provided which is preferably arranged for the purpose of circuit guidance in a line connecting the further supply line to the further exhaust line.

The named further fuel supply can be an oxygen supply or an air supply, for example in the form of a tank or of a line. The volume flow, which is larger due to the circuit guidance, has the effect that water arising on the cathode side of the fuel cell is removed particularly effectively.

In a preferred aspect of the invention, a pressure regulator is also provided in the further supply line and reduces the pressure of the further fuel supply to the operating pressure of the fuel cell or regulates it to the set value.

As stated above, the further fuel supply can be a tank containing oxygen or air or a line conducting oxygen or air, with the further supply line leading from the fuel supply to the cathode of the fuel cell and the further outlet line leading away from the cathode of the fuel cell.

In the line system consisting of the further supply line, the further outlet line and the connection line, one or more water separators are preferably arranged by means of which overflow water arising in the reaction in the fuel cell can be drained off.

In a further aspect of the invention, provision is made for one or more valves, preferably one or more multiport valves, to be provided downstream of the pressure regulator in at least one of the supply lines, said valves connecting the fuel supply to the fuel cell in a first position and the fuel supply to a further line or unit in a second position. The further line can, for example, be an exhaust air line. The further line is preferably a bypass line bypassing the fuel cell. It is also feasible for the valves to have a position in which a fuel supply does not take place either into the fuel cell or into the named line.

The valve or valves or multiport valves permit the operability of the pressure control path to be checked. For this purpose the valve(s)/multiport valves can be set into the second position in which the fuel tank(s) is/are connected to the respective lines, units or bypass lines. A pressure measurement can then be made in these to determine whether the pressure set by means of the pressure regulator is actually obtained. An arrangement of this type is important in order to be able to determine with a low effort that the system is functioning without problem and is immediately available as an energy source in case of emergency.

Instead of valves or multiport valves, any other means can also be used which permit the named flow guidance.

In a further aspect of the invention, a cooling device charged with coolant is provided for the cooling of the fuel cell which is in communication with a line through which coolant flows and in which, for the purpose of the heating of the fuel, a heat exchanger is arranged through which fuel flows and through which a flow takes place upstream of the fuel cell on the fuel side and downstream of the fuel cell on the coolant side. The cooling device with the coolant line thus serves the cooling of the fuel cell, on the one hand, and the pre-heating of the fuel supplied to the fuel cell in its section downstream of the fuel cell. The cooling of the coolant can take place by means of a heat exchanger arranged in the ram air duct.

The fuel cell can, for example, be a PEM cell (PEM=proton exchange membrane). Generally, however, the use of high temperature cells is also not precluded. A "fuel cell" can be understood as an individual fuel cell, but preferably as a stack of units of this type.

The restrictor member is preferably designed as a surge limit, i.e. the flow does not exceed a specific limit irrespective of surrounding conditions or pressure.

The invention further relates to a method of operating a fuel cell of an aircraft, with the fuel cell being supplied with fuel from a fuel supply by means of at least one supply line and with fuel not consumed in the fuel cell being drained from the fuel cell by means of at least one outlet line. Provision is made in accordance with the invention for the fuel flow to be set in that the pressure of the fuel supply in the supply line is reduced to the operating pressure of the fuel cell or is regulated to this value and in that a restriction of the non-consumed fuel flowing in the outlet line takes place in the outlet line. The use of a flow regulator is not necessary and is also not provided. The fuel can be hydrogen. This aspect of the method preferably relates to the anode side of the fuel cell.

In a further aspect of the invention, the fuel cell is supplied with fuel from a further fuel supply by means of at least one further supply line and, in the fuel cell, non-consumed fuel from the further fuel supply is drained out of the fuel cell by means of at least one further outlet line. The non-consumed fuel is preferably again supplied to the supply line. Provision can be made in this process for the non-consumed fuel to be compressed for the purpose of the supply to the supply line.

In a preferred aspect of the invention, the pressure of the further fuel supply is reduced to the operating pressure of the fuel cell or is regulated to this value. The fuel located in the further fuel supply is preferably air or oxygen.

In a further aspect of the invention, the fuel cell is cooled by means of a coolant and the fuel located in the supply lines is heated by means of the coolant before entry into the fuel cell.

As stated above, for the purpose of the monitoring, one or more valves/multiport valves can be provided by means of which a line, for example, an exhaust line, is connected to the fuel supply in one valve position. The line is preferably a bypass line bypassing the fuel cell. In this valve position, the pressure present in the bypass line can be determined and the operability of the pressure regulation can be checked in this manner. Provision is preferably made that a flow takes place through the pressure regulator during the check.

The restriction preferably takes place such that the flow through the restrictor does not exceed a specific limit (surge limit) irrespective of the surrounding conditions and the pressure.

BRIEF DESCRIPTION OF THE DRAWINGS

Further details and advantages of the invention will be explained in more detail with reference to an embodiment shown in the drawing. The only FIGURE shows a schematic overview of the fuel cell system in accordance with the invention.

DESCRIPTION OF THE PREFERRED EMBODIMENTS

The reference numeral 10 characterizes the one anode 10' and a PEM fuel cell 10 having a cathode 10".

The anode side 10' of the fuel cell 10 is supplied with hydrogen from the hydrogen pressure tank (H2 supply). It is in communication with the anode 10' of the fuel cell 10 via the supply line 30. The valve 32, which is an on/off valve, is located downstream of the hydrogen tank. The pressure regulation valve 34, which is a two-stage pressure reducer, is located downstream of the valve 32. This serves to reduce the high pressure prevailing in the hydrogen tank to the operating pressure of the anode side 10' of the fuel cell 10. The multiport valve 36 ("on/off vent valve") is located downstream of the pressure regulation valve 34 and connects the hydrogen tank to the anode 10' of the fuel cell 10 in one position and the hydrogen tank to the exhaust line or bypass line 40 in a further position.

The fuel cell 10 is preferably a stack of PEM cells (PEM: proton exchange membrane), i.e. solid electrolyte fuel cells. Other fuel cells can generally also be used.

The outlet line 50 in which the restrictor 52 is located extends downstream of the anode 10' of the fuel cell 10.

Before the flight, the desired operating pressure of the anode side 10' of the fuel cell 10 is set by means of the pressure regulation valve 34. The operating pressure is measured downstream of the pressure regulation valve 34. The anode 10' of the fuel cell 10 is operated at a low, continuous hydrogen overflow. The hydrogen flow is restricted by the restrictor 52 located in the outlet line 50 downstream of the fuel cell 10 and is restricted by means of said restrictor to the surge limit with respect to the maximum flow.

The outlet line 50 opens into the ram air duct of the airplane. A pressure level dependent on the altitude prevails in the ram air duct. At higher altitudes, a higher flow through the anode 10' of the fuel cell 10 than at lower altitudes or in ground operation results due to the greater difference between the pressure set at the pressure regulation valve 34 and the pressure prevailing in the ram air duct. The restrictor 52 in any case ensures that the hydrogen flow does not exceed the surge limit. Furthermore, it is ensured even at a comparatively high pressure in the ram air duct that the anode side 10' of the fuel cell 10 is always supplied with a sufficient hydrogen flow.

If the operability of the check valve 32 and of the pressure regulator 34, i.e. of the pressure supply, should be checked, the hydrogen source is connected to the bypass line 40 by means of the valve 36. The pressure being adopted in this process is measured in the bypass line 40. In this manner, the correction function of the valve 32 and of the pressure regulator 34 can be checked in bypass operation and it can be ensured in this manner that the system is also immediately usable in emergency operation, too.

As can furthermore be seen from the FIGURE, the line 30' which connects the hydrogen tank 20 directly to the bypass line 40 and comprises the relief valve 38 is located parallel to the supply line 30.

The cathode side 10" of the fuel cell 10 is supplied via the supply line 110 with oxygen from an oxygen tank (O2 supply). The check valve 112 by means of which the oxygen supply can be blocked from the fuel cell 10 is located in the supply line 110. The oxygen pressure regulator 114 is located downstream of the valve 112 and regulates a certain pressure similar to the hydrogen supply on the cathode side 10" of the fuel cell 10. A pressure measuring site is located downstream of the regulator 114.

Further pressure measuring sites are respectively located upstream of the check valves 32 and 112 for the measurement of the tank pressure.

The pressure relationships are set by means of the pressure regulators 34, 114 such that a pressure differential results between the anode side and the cathode side, with the pressure in the anode 10' lying above the pressure in the cathode 10".

The multiport valve 116 ("on/off vent valve"), which connects the supply for oxygen to the bypass line 120 which leads past the fuel cell 10 and opens into the surrounding atmosphere, is located downstream of the pressure regulation valve 114.

The valve 116 serves in a corresponding manner to the valve 36 for hydrogen for the inspection of the oxygen pressure supply, in particular of the valve 112 and of the pressure regulator 114 which are both located in the supply line 110 for oxygen.

The bypass line 110' which directly connects the oxygen tank to the environment and in which the relief valve 118 is arranged is arranged parallel to the supply line 110.

The outlet line 130 for non-consumed oxygen, which is connected to the supply line 110 by means of the connection line 140, extends from the cathode 10" of the fuel cell 10. The compressor 150 is further provided which ensures a circuit flow with oxygen via the cathode 10" of the fuel cell 10. The cathode 10" is also operated with fuel overflow. The circuit flow effects the effective drainage of water on the cathode side 10" of the fuel cell 10. Apart from this, a sufficient humidifying of the air supplied to the cathode 10" or of the oxygen is effected. The water separator 160, 160' serves to drain off overflow water.

If the water drainage is not sufficient, the flow speed on the cathode side of the fuel cell 10 can be increased by means of the valve 170, whereby the dehumidification or the water drainage is also correspondingly improved.

Furthermore, a coolant circuit 200 is provided whose component is the cooling device 12 which is in communication with the fuel cell 10 and which serves its cooling, as can be seen from the FIGURE. On the other hand, the coolant flow flowing through the closed coolant system 200 serves the heating of hydrogen and oxygen by means of the heat exchangers 70 and 180 arranged in the respective supply lines 30, 110. The coolant heated in the fuel cell 10 results in a heating of the supply gases hydrogen and oxygen in the corresponding heat exchangers 70 and 180.

The coolant is cooled in a heat exchanger located in the ram air duct and then flows back to the cooling device 12 of the fuel cell 10 conveyed by a pump. A water ethylene glycol mixture with an ethylene concentration of 60% is used as the coolant, for example. Other compositions and coolants can generally also be used.

The system in accordance with the invention can be used as an emergency energy system in aircraft. It is likewise generally feasible to provide the system as a replacement for batteries in aircraft.

The control of the system shown in the FIGURE is taken over by a plant control which is in communication with the components to be controlled. The energy gained by means of the fuel cell can be used in any desired manner, for example for the electrical drive of a hydraulic pump.

The invention claimed is:

1. An aircraft, in particular an airplane, having at least one fuel cell (10),
    at least one supply line (30) which connects the fuel cell (10) to a fuel supply, at least one outlet line (50) by which fuel supplied by the supply line (30) and not consumed in the fuel cell (10) is drained off, and
    means for influencing fuel flow through the fuel cell (10), wherein the means for the influencing of the fuel flow have the combination of a pressure regulator (34) located in the at least one supply line (30) upstream of said fuel cell (10) and a restrictor member (52) located in the at least one outlet line (50) downstream of said fuel cell (10),
    the pressure regulator (34) is structured and arranged to reduce pressure of the fuel supply to operating pressure of the fuel cell (10),
    the restrictor member (52) is structured and arranged to restrict and thereby reduce flow of the fuel flowing through the outlet line (50),
    a flow regulator is omitted,
    the fuel cell (10) is operated at constant pressure, and
    the aircraft has a ram air duct in which a pressure level dependent upon altitude prevails and the outlet line (10) opens into the ram air duct with the restrictor member (52) arranged in the outlet line (50) to ensure hydrogen flow through the fuel cell (10) does not exceed a surge limit and the fuel cell (10) is always supplied with sufficient hydrogen flow at all pressure levels.

2. An aircraft in accordance with claim 1, wherein the fuel supply is a hydrogen tank or a line conducting hydrogen, the supply line leads from the fuel supply to an anode (10') of the fuel cell (10) and the outlet line (50) leads off from the anode (10') of the fuel cell (10).

3. An aircraft in accordance with claim 1, wherein the aircraft has a ram air duct and the outlet line opens into the ram air duct.

4. An aircraft in accordance with claim 1, wherein a further supply line (110) is provided which connects a further fuel supply to the fuel cell (10) and a further outlet line (130) is provided by which fuel supplied through the further supply line (110) and not consumed in the fuel cell is drained off.

5. An aircraft in accordance with claim 4, wherein a connection line (140) connecting the further supply line (110) to the further outlet line (130) and a compressor (150) in the connection line (140) are provided, the compressor (150) effecting a circuit guiding in the line system constituted by the further supply line (110), the further outlet line (130) and the connection line (140).

6. An aircraft in accordance with claim 4, wherein a further pressure regulator (114) is provided in the further supply line (110), the further pressure regulator (114) reducing the pressure of the fuel supply to the operating pressure of the fuel cell (10).

7. An aircraft in accordance with claim 4, wherein the further fuel supply is a tank containing oxygen or air or a line conducting oxygen or air, the further supply line (110) leads from the fuel supply to a cathode (10") of the fuel cell (10) and the further outlet line (130) leads away from the cathode (10") of the fuel cell (10).

8. An aircraft in accordance with claim 4, wherein one or more water separators (160, 160') are arranged in the line system constituted by the further supply line (110), the further outlet line (130) and the connection line (140).

9. An aircraft in accordance with claim 1, wherein one or more valves (36, 116), preferably one or more multiport valves (36, 116), are provided in one or both of the supply lines (30, 110) downstream of the pressure regulator (34, 114), which connect the fuel supply to the fuel cell (10) in a first position and the fuel supply to a further line (40, 120) or unit in a second position.

10. An aircraft in accordance with claim 9, wherein the further line (40, 120) is a line bypassing the fuel cell.

11. An aircraft in accordance with claim 1, wherein a cooling device (12) charged with coolant is provided for cooling of the fuel cell (10) which is in communication with a line (200) through which coolant flows and in which, for heating of the fuel, at least one heat exchanger (70, 130) is arranged through which fuel flows and through which a flow takes place upstream of the fuel cell (10) on the fuel side and downstream of the fuel cell (10) on the coolant side.

12. An aircraft in accordance with claim 1, wherein the fuel cell (10) is a PEM cell.

13. An aircraft in accordance with claim 1, wherein the restrictor element (52) is structured and arranged to prevent the flow from exceeding a surge limit with respect to maximum flow.

14. An aircraft in accordance with claim 1, wherein said pressure regulator (34) is structured and arranged to reduce the pressure of the fuel supply in two stages.

15. The aircraft of claim 1, wherein said restrictor member (52) is a restrictor.

16. The aircraft of claim 3, wherein said restrictor member (52) is a restrictor.

* * * * *